(12) United States Patent  
Larson et al.

(10) Patent No.: US 8,931,420 B2  
(45) Date of Patent: Jan. 13, 2015

(54) APPARATUS AND METHOD FOR SIDE BY SIDE COUPLABLE PALLETS AND CARTS

(75) Inventors: Merle A. Larson, Cannon Falls, MN (US); Ralph T. Morgan, Tyler, TX (US); Patrick J Geraghty, Minneapolis, MN (US)

(73) Assignee: Cannon Equipment Company, Rosemount, MN (US)

( * ) Notice: Subject to any disclaimer, the term of this patent is extended or adjusted under 35 U.S.C. 154(b) by 223 days.

(21) Appl. No.: 13/373,551

(22) Filed: Nov. 18, 2011

(65) Prior Publication Data

US 2012/0134771 A1     May 31, 2012

Related U.S. Application Data

(60) Provisional application No. 61/458,158, filed on Nov. 18, 2010.

(51) Int. Cl.
| | | |
|---|---|---|
| *A47B 57/00* | (2006.01) | |
| *B65D 19/44* | (2006.01) | |
| *B62B 3/02* | (2006.01) | |
| *B65D 19/42* | (2006.01) | |

(52) U.S. Cl.
CPC . *B62B 3/02* (2013.01); *B65D 19/42* (2013.01); *B62B 2207/02* (2013.01); *B62B 2501/02* (2013.01); *B65D 2519/00024* (2013.01); *B65D 2519/00034* (2013.01); *B65D 2519/00164* (2013.01); *B65D 2519/00174* (2013.01); *B65D 2519/00502* (2013.01); *B65D 2519/00512* (2013.01); *B65D 2519/00616* (2013.01); *B65D 2519/00631* (2013.01); *B65D 2519/00666* (2013.01); *B65D 2519/00746* (2013.01); *B65D 2519/00781* (2013.01)
USPC .......................... 108/64; 108/54.1; 108/55.1

(58) Field of Classification Search
USPC .................... 108/64, 51.11, 54.1, 55.1, 56.1; 248/346.02; 280/79.3; 211/85.8, 194, 211/195, 175, 186
See application file for complete search history.

(56) References Cited

U.S. PATENT DOCUMENTS

| | | | | |
|---|---|---|---|---|
| 1,518,497 | A * | 12/1924 | Flood et al. ................... | 108/55.1 |
| 2,598,800 | A * | 6/1952 | Kopper ...................... | 108/55.1 |
| 2,647,287 | A * | 8/1953 | Jones .......................... | 108/55.1 |
| 4,045,043 | A * | 8/1977 | Fourrey ...................... | 280/79.3 |
| 4,344,368 | A * | 8/1982 | Remington et al. ......... | 108/55.1 |
| 4,694,962 | A * | 9/1987 | Taub ............................ | 108/54.1 |
| 4,986,555 | A * | 1/1991 | Andreen ...................... | 280/79.3 |
| 5,105,746 | A * | 4/1992 | Reynolds .................... | 108/54.1 |
| 5,139,385 | A | 8/1992 | Chase et al. | |

(Continued)

OTHER PUBLICATIONS http://fullepisode.info/national-geographic-ultimate-factories-coca-cola.

*Primary Examiner* — Jose V Chen  
(74) *Attorney, Agent, or Firm* — Pyle & Piontek, LLC

(57) ABSTRACT

A pallet or cart which can be coupled to a similar pallet or cart in a side by side relationship is disclosed. The pallet or cart, at its one or right side, has a coupling, which cooperate with an associated coupling on the opposite or left side of an adjacent pallet or cart. The couplings and the associated couplings can be connected to connect the two pallets or carts together to make them capable of being moved together, and even be lifted and lowered together by a standard lift truck or fork lift or a standard pallet jack. The couplings are also releasable so that, when necessary, each pallet or cart may be used as would be a single pallet or cart. The pallet or cart may have one or more foldable shelves therein.

17 Claims, 16 Drawing Sheets

(56) References Cited

U.S. PATENT DOCUMENTS

| | | | | |
|---|---|---|---|---|
| 5,562,047 A * | 10/1996 | Forney et al. | | 108/56.1 |
| 5,860,369 A * | 1/1999 | John et al. | | 108/56.1 |
| 5,871,108 A * | 2/1999 | White | | 211/186 |
| 5,947,494 A * | 9/1999 | Thogersen et al. | | 280/79.2 |
| 6,234,087 B1 * | 5/2001 | Brown | | 108/55.1 |
| 6,402,167 B1 * | 6/2002 | Calleja | | 280/79.3 |
| 7,131,543 B2 * | 11/2006 | Mason | | 280/79.3 |
| 7,360,493 B2 * | 4/2008 | Hummel et al. | | 108/54.1 |
| 7,993,095 B2 * | 8/2011 | Reichler | | 414/789.6 |
| 2005/0235885 A1 * | 10/2005 | Salmanson et al. | | 108/55.1 |
| 2006/0213402 A1 * | 9/2006 | Grimal | | 108/51.11 |

* cited by examiner

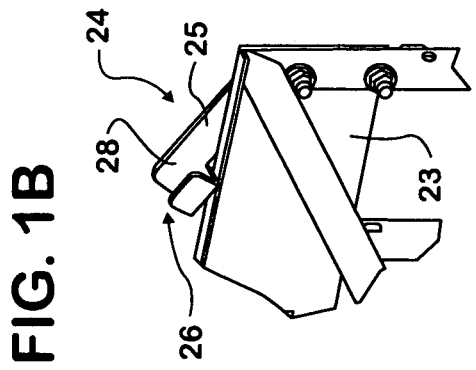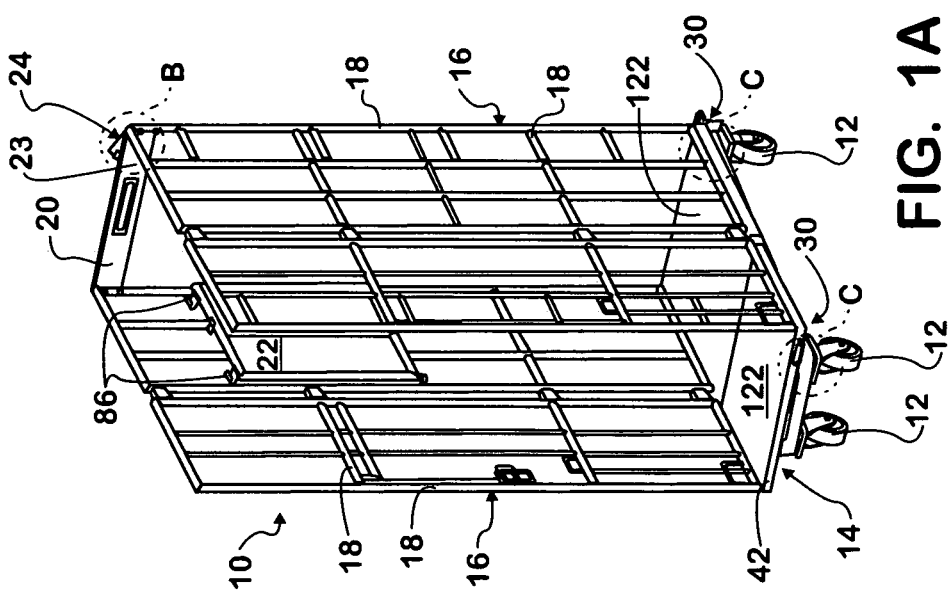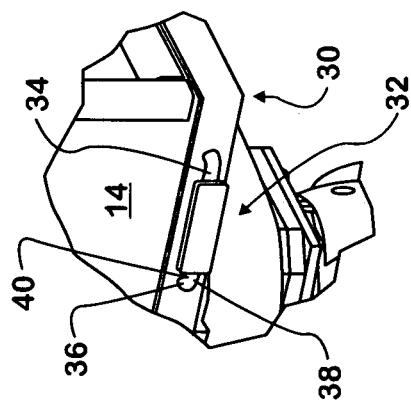

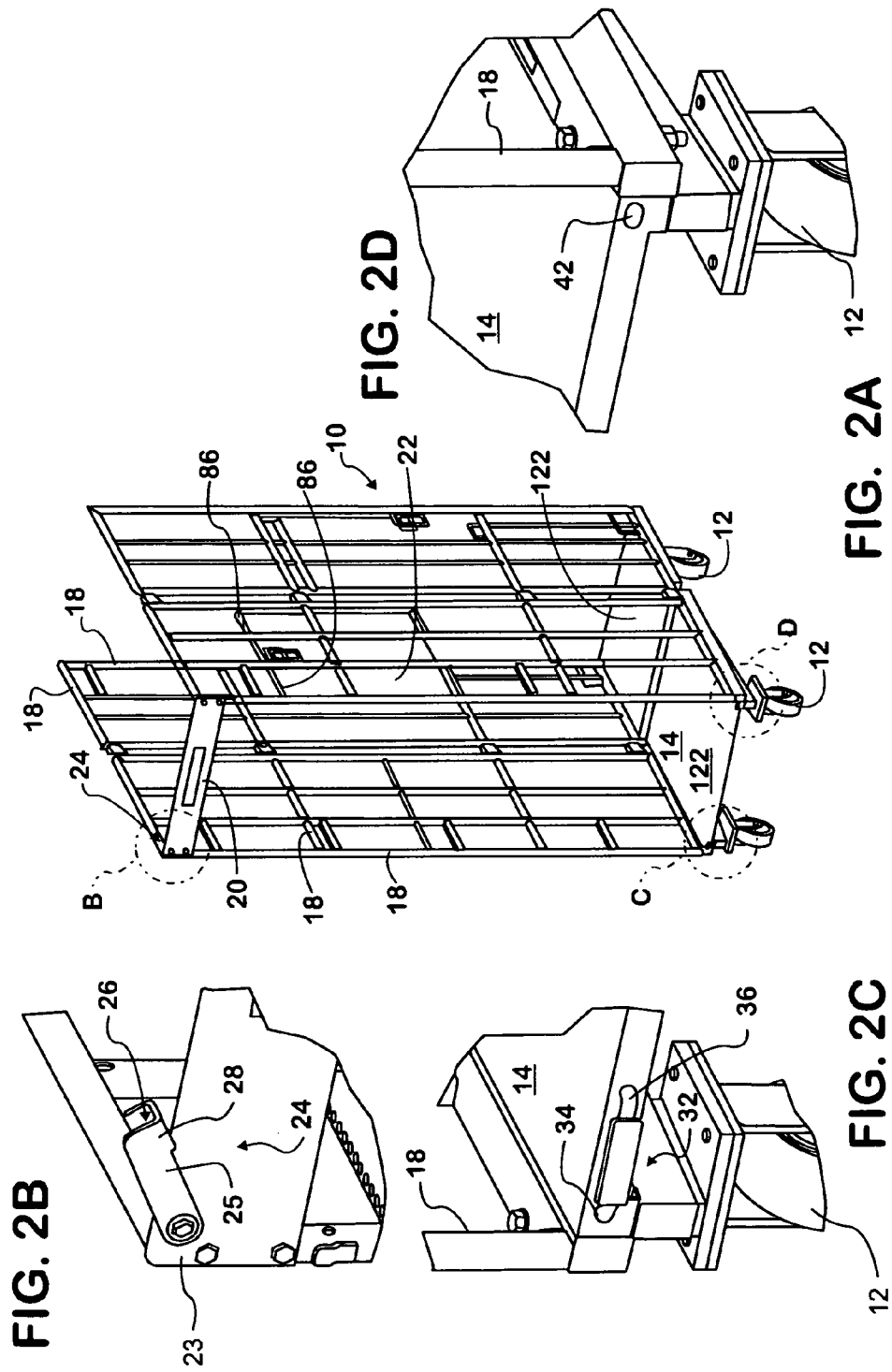

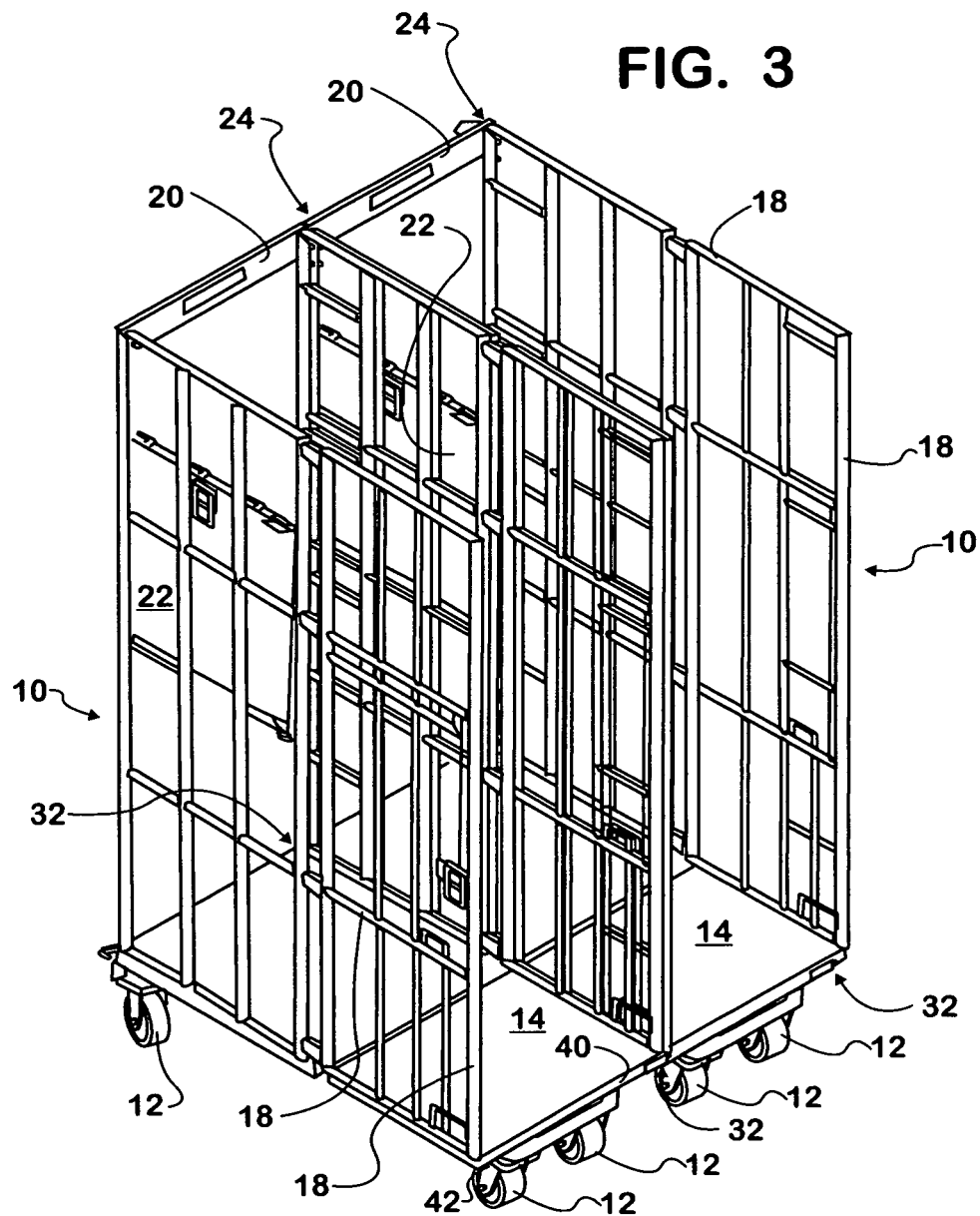

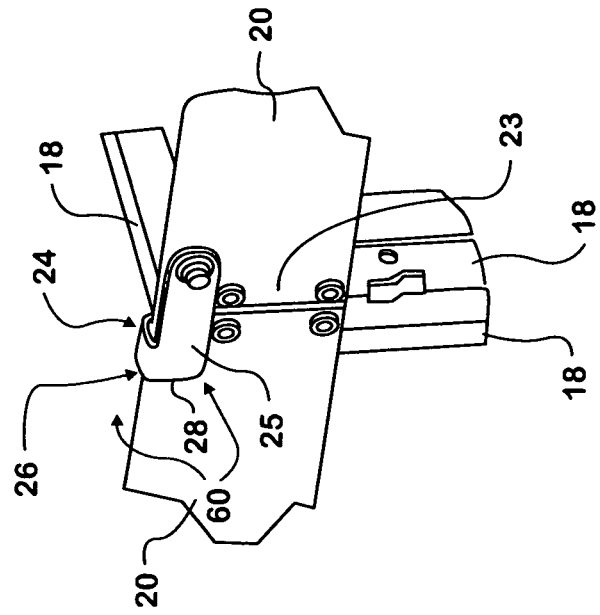
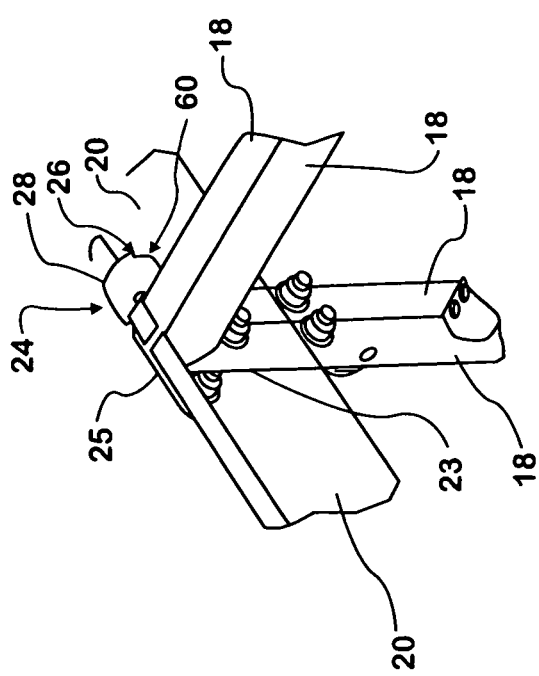

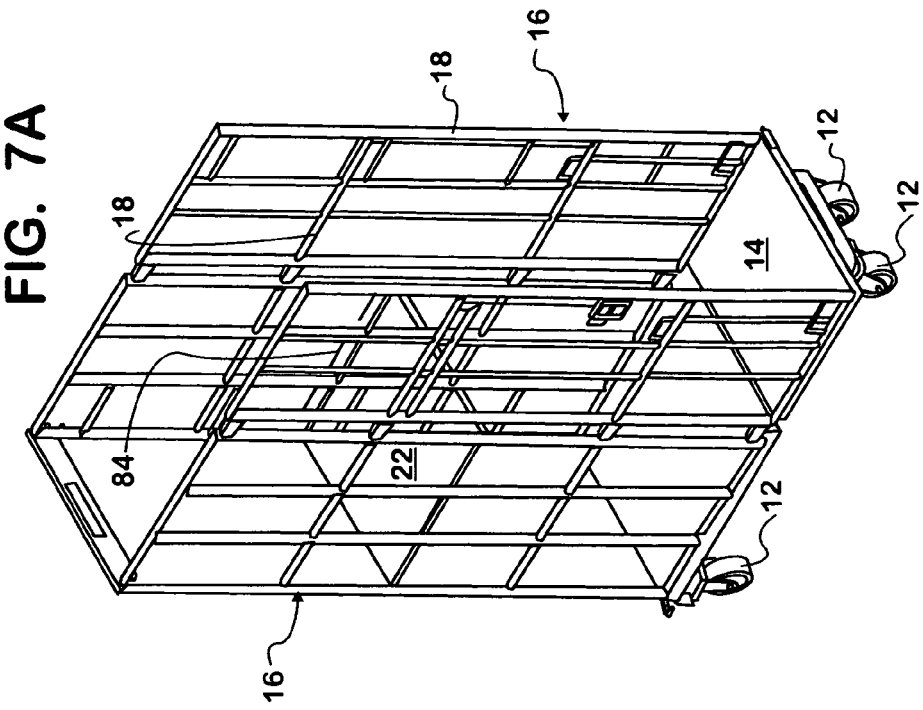
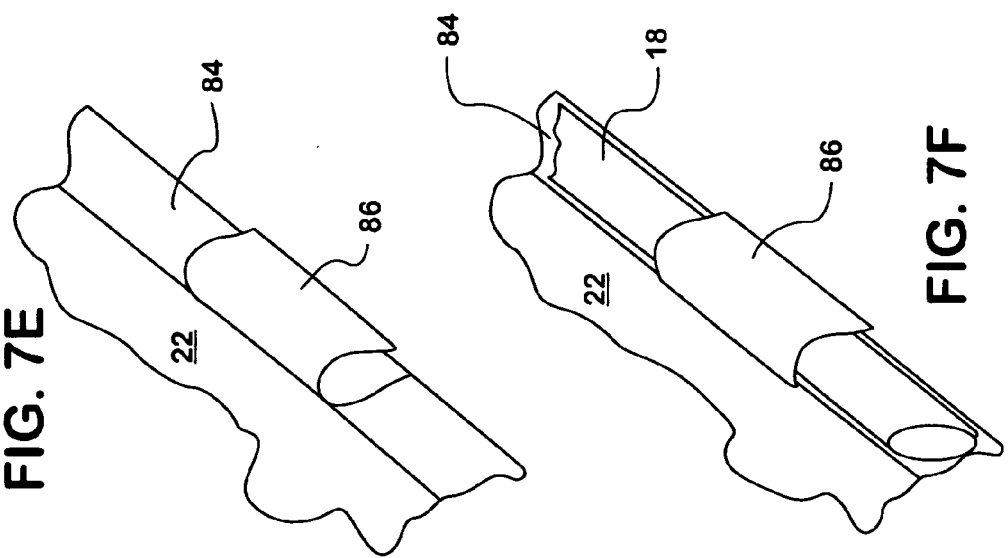

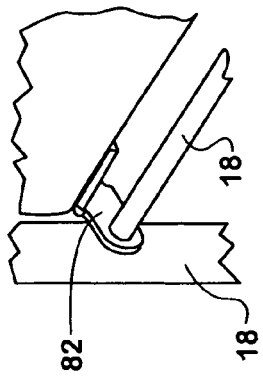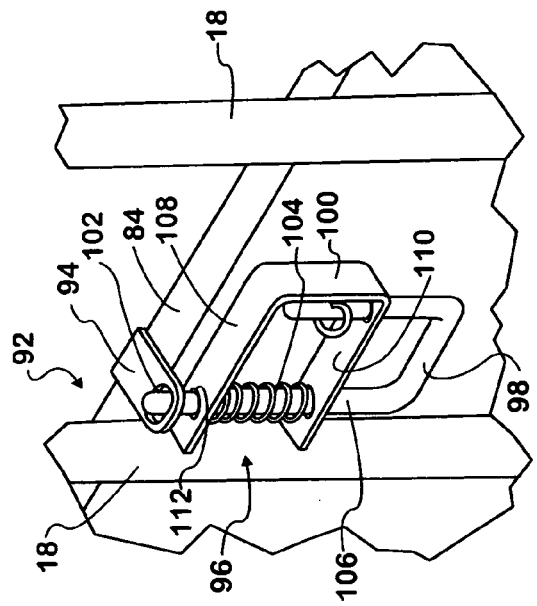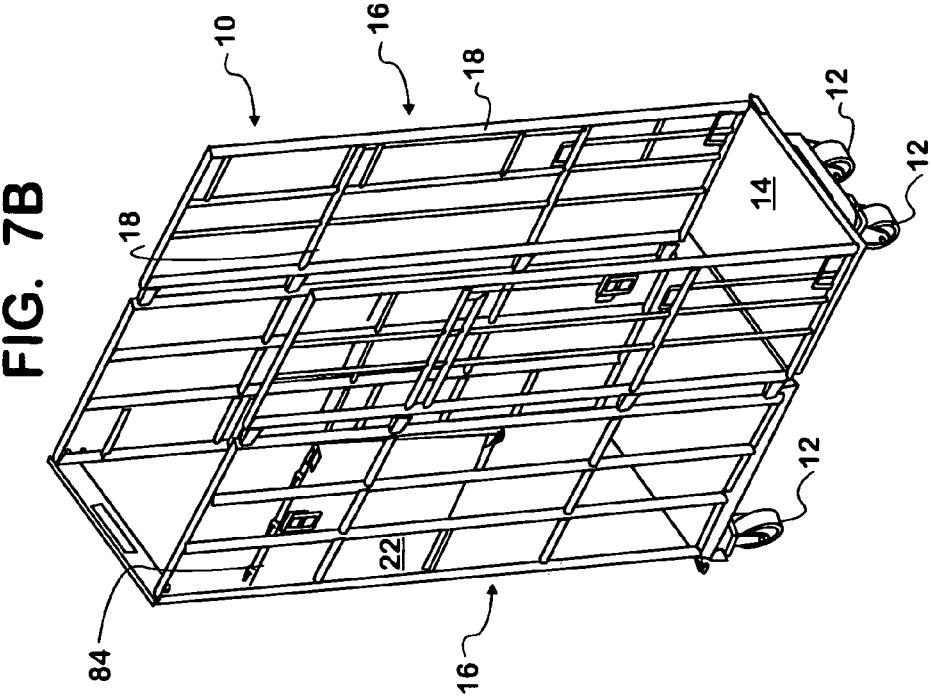

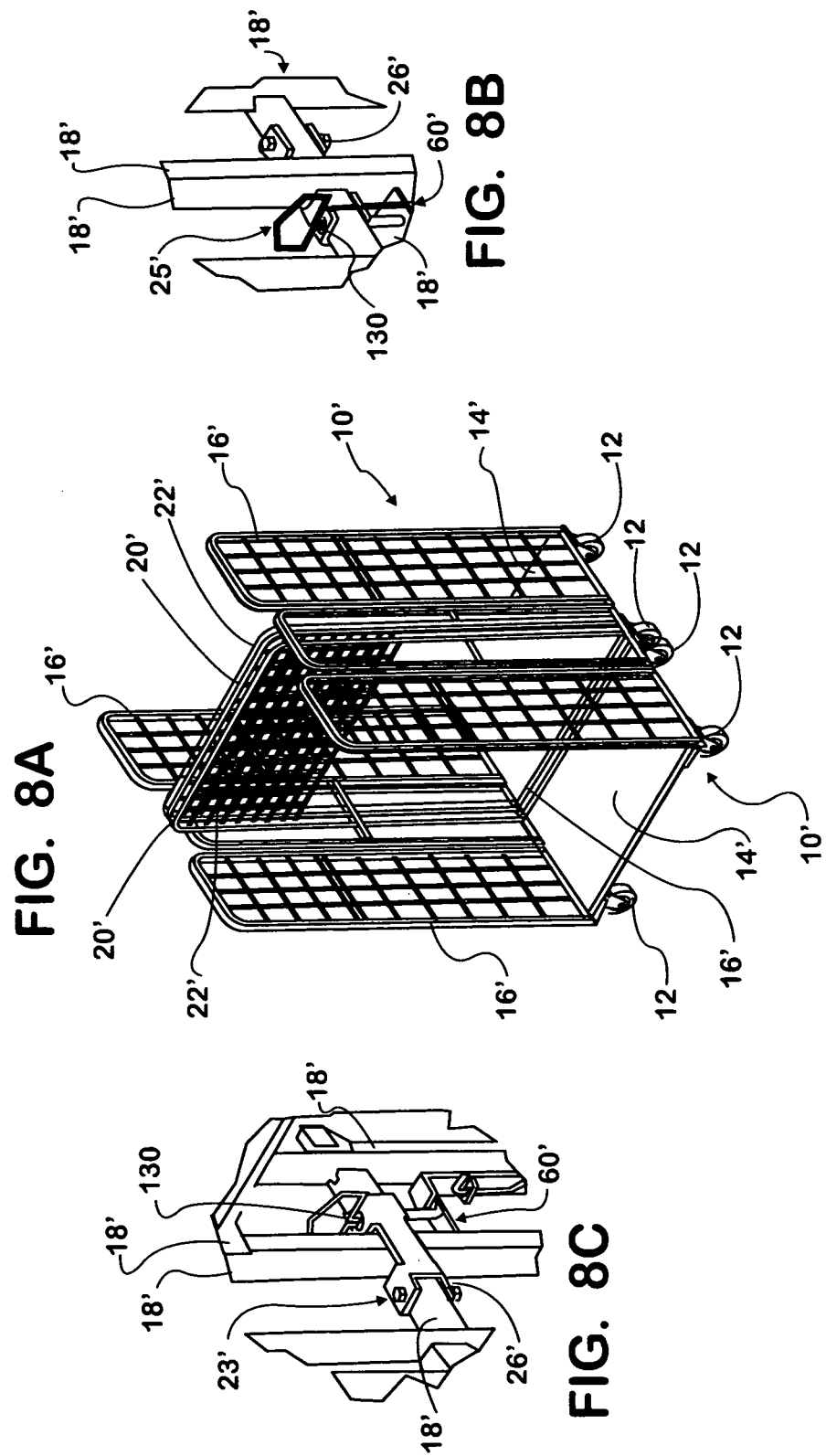

Pallet/Cart Dimensions

|  | Width | Depth or Length | Height | Weight | Ground Clearance |
|---|---|---|---|---|---|
| Broad Range | 30" - 80" | 20" - 40" | 48" - 92" | 75 lbs. - 250 lbs. | 5" - 12" |
| Narrow Range | 33" - 52" | 22" - 35" | 56" - 86" | 87 lbs. - 210 lbs. | 6" - 11" |
| Preferred Range | 36" - 48" | 24" - 30" | 64" - 80" | 100 lbs. - 175 lbs. | 8" - 10" |

Fig. 12

APPARATUS AND METHOD FOR SIDE BY SIDE COUPLABLE PALLETS AND CARTS

DISCLOSURE

This is a United States Non-Provisional Patent Application based on U.S. Provisional Patent Application Ser. No. 61/458,158, filed Nov. 18, 2010, of which the benefit of and the filing date is claimed, and relates to carts or pallets for moving items and more particularly to carts or pallets which may be side by side, coupled, moved and lifted together.

BACKGROUND OF THE INVENTION

It is known to use a cart to collect and distribute items, for example and not by way of a limitation, to pick an order in a warehouse or distribution center. These carts are then assembled and loaded, for example into a railroad car or truck, and taken to another location, such as for example, a retail store. These items on the cart are taken from the truck, and the cart is used to restock the store's shelves. It is known to take a single cart and lift it with, for example a lift truck or fork lift, the two fork tines or tangs of the lift truck engaging the bottom of the single cart to load it into and unload it from the truck.

While it is known in U.S. Pat. No. 5,139,385 to load two pallets at once with a lift truck, the pallets are not coupled, and a special lift truck must be used which has a total of four lift truck fork tangs, with two fork tangs being placed under each pallet to keep it generally horizontal and balanced.

SUMMARY OF THE PRESENT INVENTION

The present invention relates to a unique cart or pallet which can be coupled to a similar unique cart or pallet in a side by side relationship, and moved together, or separately, and lifted together or separately.

The cart or pallet of the present invention at or adjacent its one, say, right side has coupling means at the top and bottom, which can cooperate with associated coupling means on the top and bottom at or adjacent the other, say left side of an adjacent cart or pallet. The coupling means or associated coupling means can be part of the cart structure. The coupling means and associated coupling means can be connected to each other to connect the two carts together to make them capable of being moved together and even be lifted together by a standard lift truck or fork lift having only the normal two fork tines or tangs. While described to work with a standard lift truck, the carts (or pallets) of the present invention can be used with a conventional pallet jack, either powered or manual, having either two tangs or even a single lift surface having a wide flat lifting surface.

The coupling means and associated coupling means can be in various forms: such as a clip that pivots on one cart or pallet and clips over a portion of the other cart or pallet (FIG. 1B), a rotatable shaped bar or pin on one cart of pallet which engages in the other cart or pallet (FIG. 1C); a threaded bolt rotatably captured on one cart or pallet, which can be engaged with a fixed threaded nut or structure on the other cart or pallet, or the reverse construction, bands securing the two carts or pallets together, a pivoted bar which engages in and is pinned in place in a "U" shaped bracket (FIGS. 8 to 10), etc. Most known cooperating fastening means could be adapted to form the releasable connecting coupling means and associated coupling means.

The advantage of the present invention is that, for example, in a warehouse and/or distribution center, the two coupled carts or pallets can be moved together by a single operator, and two carts or pallets and their orders completed and/or picked at once. This dual capability (doing two at once) increases the efficiency of this stage of order filling. Use of this concept maximizes efficiencies by allowing the user to treat the unit as a single cart or pallet (handles/acts just like a single cart or pallet) at the order picking/shipping stages and yet can act as one or two separable, individual carts at the destination point.

The carts or pallets are constructed, so that, when coupled, they may be lifted and loaded and unloaded by a standard fork lift truck that has but the usual two fork tines or tangs. While the concept is described with respect to a cart with wheels some aspects thereof such as the coupling concept can be equally applied to a pair of (wheel less) pallets, particularly if the pallets have some height to increase the effectiveness of the side by side coupling.

In the method or process, when the carts (or pallets) are side by side, they can be coupled or connected, and then moved down an aisle or lifted together by a forklift or pallet jack as a single unit and then raised or lowered by the lift truck or pallet without falling over, with only one tang or tine of the lift under each of the two coupled carts or pallets. If a pallet jack with two tangs is used it would be in a manner described, and the tangs would be centered under both coupled carts or pallets. This ability to lift, move, lower, load and unload two side by side coupled together carts or pallets, greatly speeds up and increases the efficiency of these stages of the processes of order filling and restocking stores by using the coupled carts or pallets. Were the carts or pallets not coupled side by side, they could not be lifted, moved, or lowered by the standard fork lift truck with but two fork tangs, as the carts (or pallets) would be likely to fall over. Generally the destination point (retail store) may have a standard two tang or tine lift truck or standard pallet jack so the unloading as discussed above can be done. Another advantage of this system is, because the two carts coupled together can be of the same footprint as a conventional pallet, the two carts or pallets take up the same space in a truck and can be used or interchanged with conventional pallets or carts with no loss of space in the truck.

The present invention of side by side coupled carts or pallets avoids the need and expense of the heretofore needed extra cost, extra weight, special lift trucks with four fork tangs that were heretofore used to lift two separate pallets.

When, for example, the coupled carts (or pallets) are delivered to a retail store, they can be unloaded together and then uncoupled and used in a normal manner to, say, restock the store as would two separate conventional carts. Thus, the ability to move the carts of the present invention in a narrower aisle (than those in the warehouse) in the retail store is preserved.

The carts can be made of steel and/or aluminum, fiberglass and/or strong plastic or other material, or partially made of one or more of the above or other materials. For example, the sides could be a metal frame with netting extending across the frame. Typical dimensions for the carts or pallets are shown herein. See FIG. 12. When in the form of a cart, each would have at least three ground engaging portions in the form of wheels to be self supporting and movable individually, with preferably at least four used. When used as a pallet each would have at least three or more ground engaging portions, or any other construction which permits each pallet to also stand on its own when uncoupled, but yet be liftable.

To accommodate engagement by one fork lift tang or tine, each cart may have a single centered flat bottom area partially enclosed by the cart frame to help hold the one cart of the two to be lifted coupled carts over its respective fork lift fork tang or tine. If a pallet jack of the single wide surface is used, its top lifting surface can engage with both the bottoms of the two connected carts (or pallets) see FIG. 11.

An additional feature of the cart or pallet of the present invention is it can be provided with a foldable shelf with hinge means and latch means which permits the foldable shelf to be put in place in a first position to carry or hold further smaller items, or in a second or stored position where it may be folded out of the way to permit the cart or pallet to carry or hold larger items.

The above and other advantages of the side by side coupled cart (or pallets) apparatus, wherein each cart or pallet may include a foldable shelf, and method or process of the present invention will become further apparent from the following written description and the accompanying figures of the drawings. For convenience it should be understood that when the term cart or carts is used below, it can in most circumstances also include pallet or pallets, except in certain circumstances wherein for example one would be talking about a cart with wheels.

BRIEF DESCRIPTION OF THE DRAWINGS

FIG. 1A is a perspective view from the front and right side of the cart of the present invention showing top or upper and bottom interconnection or coupling means thereon.

FIG. 1B is an enlarged perspective view of area B of FIG. 1A and shows one form of rear top interconnection or coupling means for use in releasably coupling two carts together, the coupling means being shown in a nonused or noncoupling state.

FIG. 1C is an enlarged perspective view of front and rear areas C of FIG. 1A and shows one form of bottom interconnection or coupling means for use in releasably coupling two carts together, the coupling means being shown in a retracted, noncoupling state.

FIG. 2A is a perspective view from the rear and left side of the cart of the present invention showing the associated interconnection or associated coupling means thereon.

FIG. 2B is an enlarged perspective view of area B of FIGS. 1A and 2A and shows top rear interconnection or coupling means for use in releasably coupling two carts together, the coupling means being shown in a retracted, noncoupling state, the associated coupling means being provided by the top horizontal bar structure of the cart over which the coupling means fits.

FIG. 2C is an enlarged perspective view of front and rear areas C of FIG. 2A (which is also similar to the construction shown in FIG. 1C) and shows bottom coupling means at a right rear and right front end of a horizontal base of the cart for use in releasably coupling two carts together, the coupling means being shown in a noncoupling state.

FIG. 2D is an enlarged perspective view of area D of FIG. 2A and shows associated coupling means, here in the form of a bottom cooperating or associated coupler receiving bore or opening at a left rear and/or front end of a horizontal base of the cart, for use in releasably coupling two carts together, the associated coupling means being shown in a noncoupling state. (A similar associated connecting means is also provided at the lower left of the cart shown in area C FIG. 1A).

FIG. 3 is a perspective view of a pair of the carts of the present invention showing them interconnected or coupled to each other by the interconnection or coupling and associated coupling means of the present invention.

FIG. 4A is a front detail view of the upper interconnection or coupling means of one of the carts shown interconnected or coupled to associated coupling means (herein being a part of that cart's structure) of a second one of a pair of side by side positioned carts.

FIG. 4B is a rear detail view of the upper interconnection or coupling means (of FIG. 4C) of one of the carts shown connected or coupled to associated coupling means (of FIG. 4C) of a second one of a pair of side by side positioned carts.

FIG. 7A shows a foldable shelf in the cart in a horizontal "shelf" position.

FIG. 7B shows the shelf of FIG. 7A in a vertical folded position.

FIG. 7C shows the detail construction of one form of the hinge means for the shelf of FIG. 7A.

FIG. 7D shows the detail of the construction of one form of the latch means for the shelf of FIG. 7B for maintaining the shelf in the folded position FIG. 7E shows one form of the detail of the construction of the swing end of the shelf incorporating hook means for engaging a horizontal rod on a side of the cart opposite to the side having the hinge means to hold it in a shelf position.

FIG. 7F shows one form of the detail of the hook means of the swing end of the shelf engaged to and over the horizontal rod for maintaining the shelf in the "shelf" position.

FIG. 8A shows another embodiment of carts of the present invention having different coupling means and associates coupling means; these two carts can be moved, lifted and lowered in a manner like the embodiment shown in FIGS. 1A to 7D.

FIG. 8B shows details of the carts of FIG. 8A coupled using a pivoting bar on one cart pinned in place in a "U" shaped bracket on the other cart.

FIG. 8C shows details of the FIG. 8B carts, but from a different view

FIG. 12 is a table of useful pallet/cart dimensions

DESCRIPTION OF THE PREFERRED EMBODIMENT

Figure 4C:
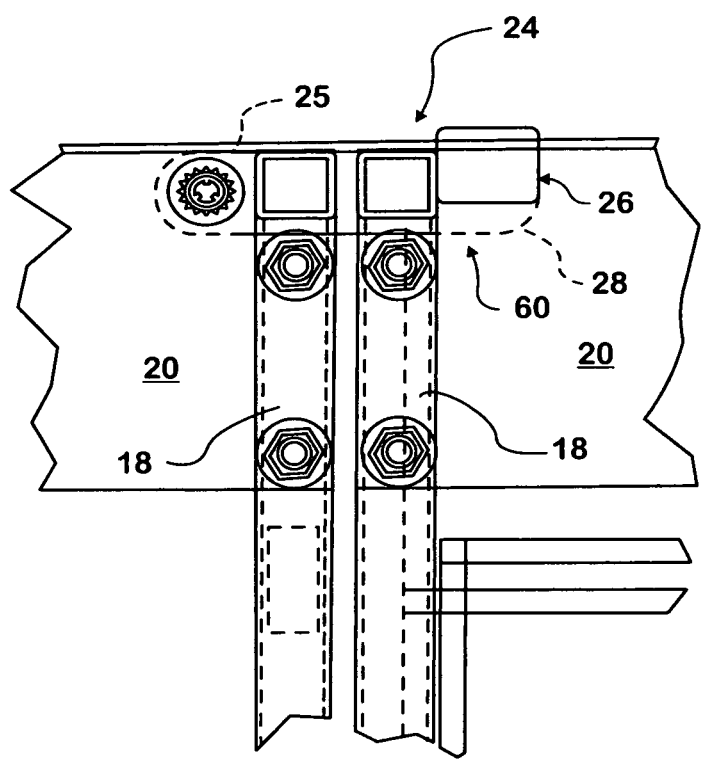
FIG. 4C is an enlarged front view of the portions FIG. 4A and FIG. 4B, and shows the coupling means and associated coupling means in use to interconnecting side by side carts.

Referring to the drawings in greater detail, there is illustrated therein the side by side releasably couplable carts made in accordance with the teachings of the present invention, and generally identified by the reference numeral 10, and method or process for coupling and uncoupling a pair of the releasably couplable carts 10 and 10.

Summarily, there is disclosed herein a releasably couplable cart 10 (FIG. 1A) having coupling means at and along a first side thereof, at both the front and back of the cart 10, which couple or interconnect with associated coupling means at and along an opposite side of an adjacent cart 10 (FIG. 3), providing a set of two of such carts 10 coupled together, which set of carts 10 can be engaged by a regular fork lift truck, one tine or tang of the fork of the fork lift truck engaging under one of the carts 10 in a generally centered position there under, the set of two of such carts being engageable, liftable, movable, lowerable, and disengageable from a fork lift truck without compromising the required generally horizontal positioning of the set of two coupled carts 10.

Turning to FIG. 1A, there is illustrated therein one cart 10 having at least three ground engaging means, preferably in the form of four wheels 12, a solid base 14, upstanding side walls 16 made of spaced apart and engaged vertical and horizontal elements 18 such as rods 18, a top rear cross member 20 extending between and engaged to each of the side walls 16, and is, in this instance, without a front wall. Of course, if desired a front wall or door could be provided. The cart 10 may be provided with one or more pivotable shelves 22 which, for example, extend between and releasably engage to and between side walls 16, at a desired position (see FIGS. 1A and 7A), for example, a position substantially adjacent to and substantially below the top rear cross member 20 as shown. Optionally, this shelf could be pivoted from the rear wall and engage the side walls.

Also provided at a top right end 23 of the top rear cross member 20 are interconnection, coupler or coupling means 24, for example, in the form of a pivotable arm 25 having a hook 26 at a free end 28 thereof which engages associated coupling means 60, in this instance, a portion 60 of the top rear cross member 20 of an adjacent cart 10, at a position substantially adjacent a top rod 18 of the left wall 16 of the adjacent cart 10, as best shown in FIGS. 1B, 2B and 4A-4C.

Figure 5A:
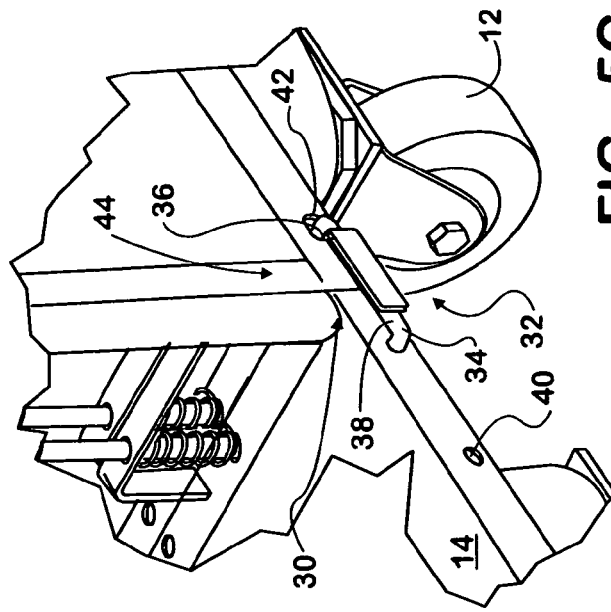
FIG. 5A shows a detail view of one bottom interconnection or coupling means at a first end of the rear or front of one of the carts, the coupling means being shown in a stored, noncoupled state.
Figure 5B:
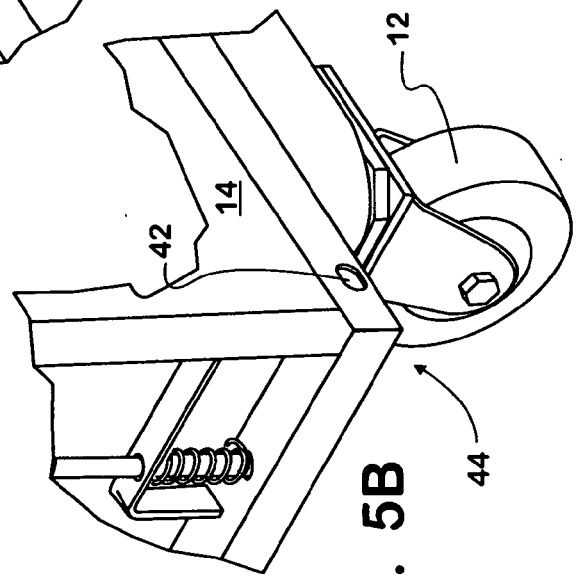
FIG. 5B shows a detail view of one bottom associated coupling means here shown to comprise a cooperating coupler bore or opening at a second end of the rear or front of one of the carts, the associated coupling means being shown in an uncoupled state.
Figure 5C:
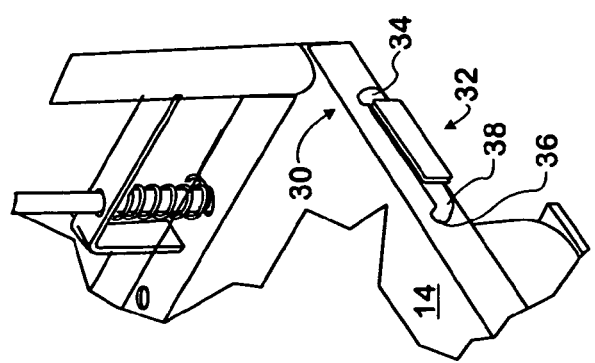
FIG. 5C shows one end of one bottom coupling means of a first cart connected or coupled to the bottom associated coupling means shown here in the form of a cooperating or associated coupling or coupler bore at the end of a second cart.

Further, provided at front and rear bottom of one, here the right ends 30 of the solid base 14 are further interconnection or coupling means 32, here in the form of a spring biased pivotable rod 34 having a perpendicular hook or crook 36 on free end 38 thereof. The crook 36 seats within a cooperating storage bore 40 at a predetermined position in the base 14 when not in use, as shown in FIG. 1C. In use the hook or crook is pivoted and extends across a predetermined length between side by side oriented two carts 10 and engages, in a biased manner, within associated coupling means 42, here, for example, in the form of a cooperating bore 42 in an opposite or left end 44 of an adjacent cart 10, as best illustrated in FIG. 5C, to join or couple the front and rear adjacent bottom bases 14 of the carts 10 together, in a side by side orientation, as best illustrated in FIG. 3.

Figure 6A:
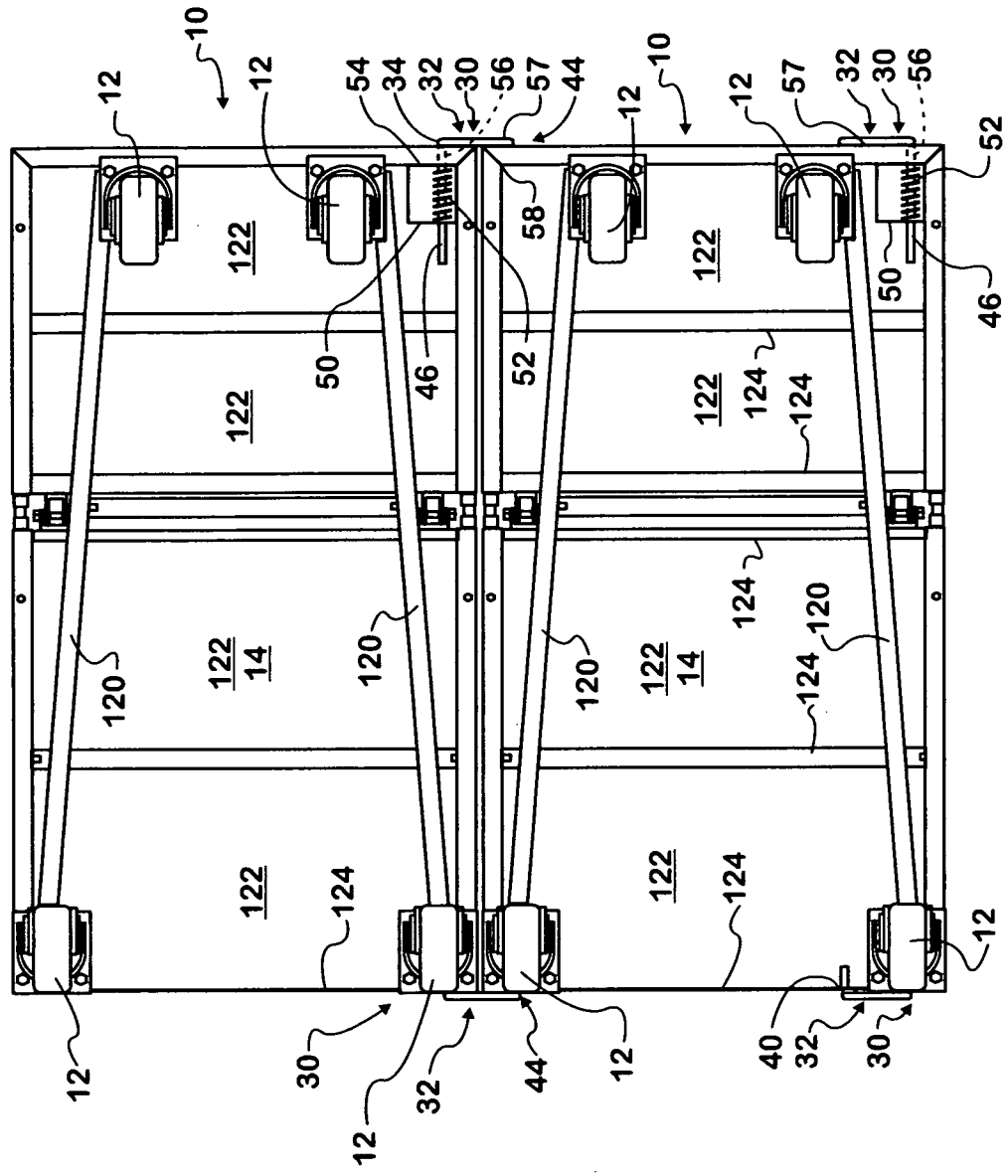
FIG. 6A shows the bottom view of two carts coupled together by one pair each of front and rear bottom interconnection or coupling means of the first cart coupled to associated coupling means, here shown to comprise a cooperating pair of front and rear bottom associated or cooperating coupler bores of the second cart, and shows the detail of the bottom interconnection or coupling means and further shows a pair of bottom front and rear coupling means of the first and second carts in stored states.
Figure 6C:
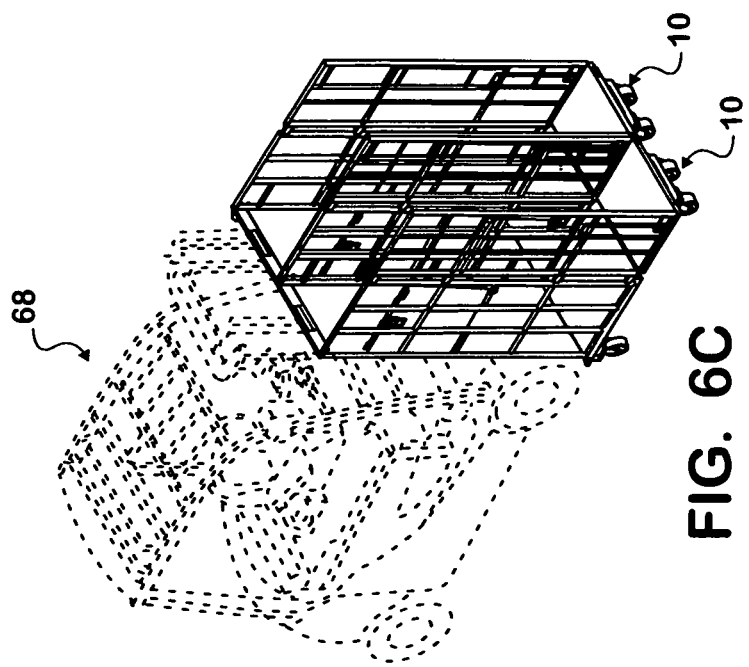
FIG. 6C shows the coupled carts of the present invention being acted upon by a fork lift truck used to engage the two carts, lift the two carts, move the two carts and lower the two carts, as needed.

In FIG. 6A, a bottom view of two interconnected carts 10 is provided. It will be seen that each cart 10 has the coupling means 32 on the base 14 thereof, here, for example, in the rod 34 is in the form of a "J" shaped having a first longer end 46 thereof engaged to a framework 50 for same on the underside of the base 14 of the cart 10, the longer end 46 being biased inwardly by a spring 52 which engages over the longer end 46 between the framework 50 and a downwardly depending end flange 54 of the base 14 of the cart 10. The longer end 46 extends outwardly through a bore 56 in the flange 54 where the material of the rod 34 is bent at a center section 57 at approximately 90 degrees to the longer end 46, extending a predetermined distance (sufficient to reach the associated coupling means on the other cart) in the horizontal direction along the flange 54, with a free end 58 of the rod 34 again bending approximately 90 degrees from the center section 57, back in the direction in which the longer end 46 extends. When in a stored or resting position, the free end 58 of the each rod 34 engages within the cooperating storage bore 40, the position of which is predetermined so that the center section 57 rests along the base 14, out of the way, as best shown in FIGS. 5C and 6A.

Figure 6B:
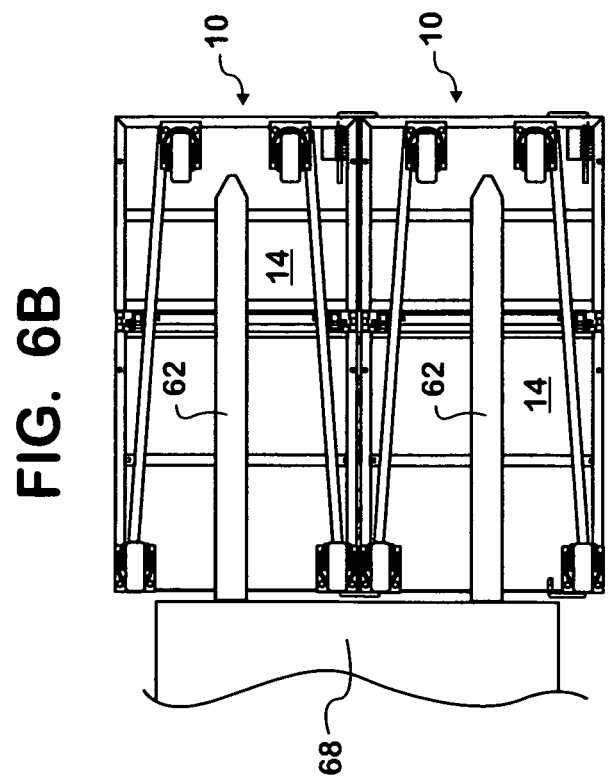
FIG. 6B, in reduced scale, shows the bottom view of FIG. 6A with one tang or tine of a fork of a fork lift truck engaged under each of the two coupled carts, one tang or tine being substantially centered beneath each one of the two coupled carts.
Figure 9:
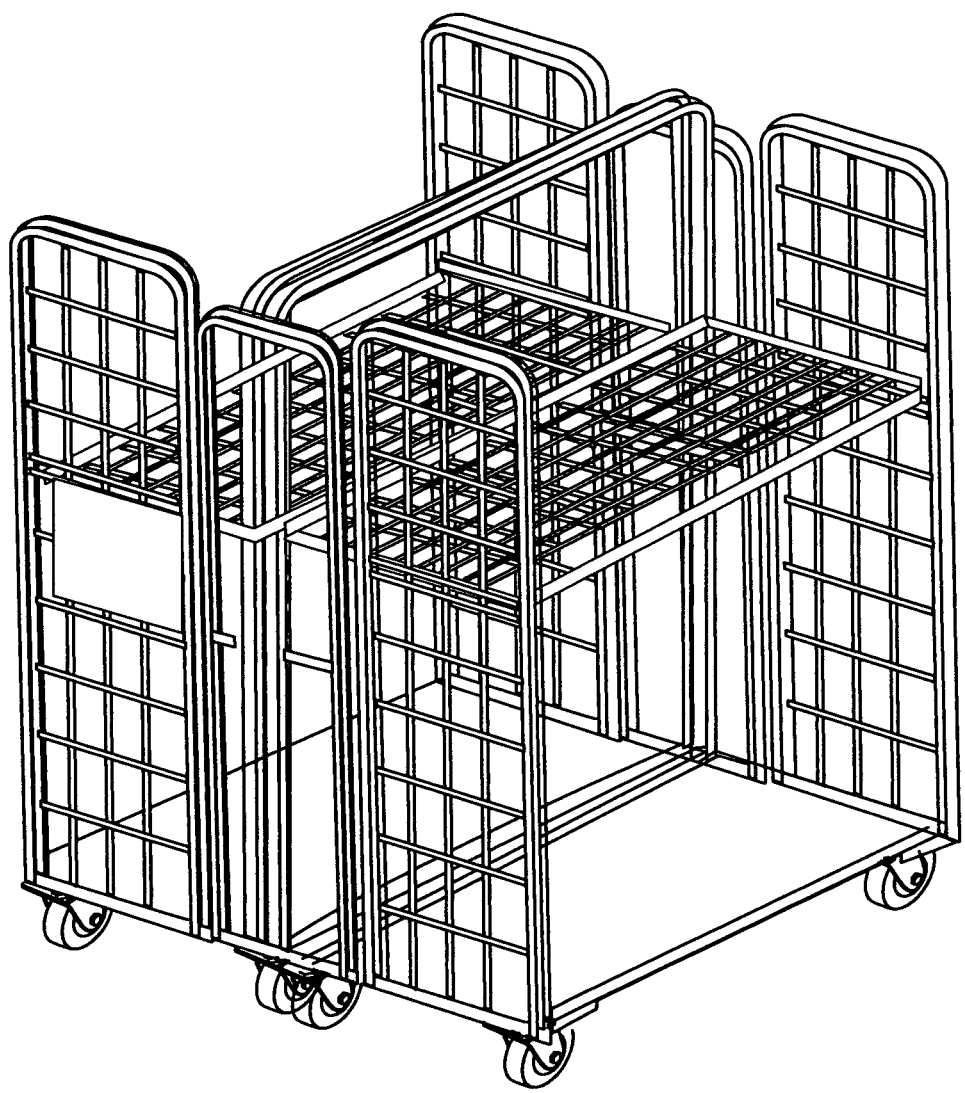
FIG. 9 shows the two carts of FIG. 8A from one view point.
Figure 10:
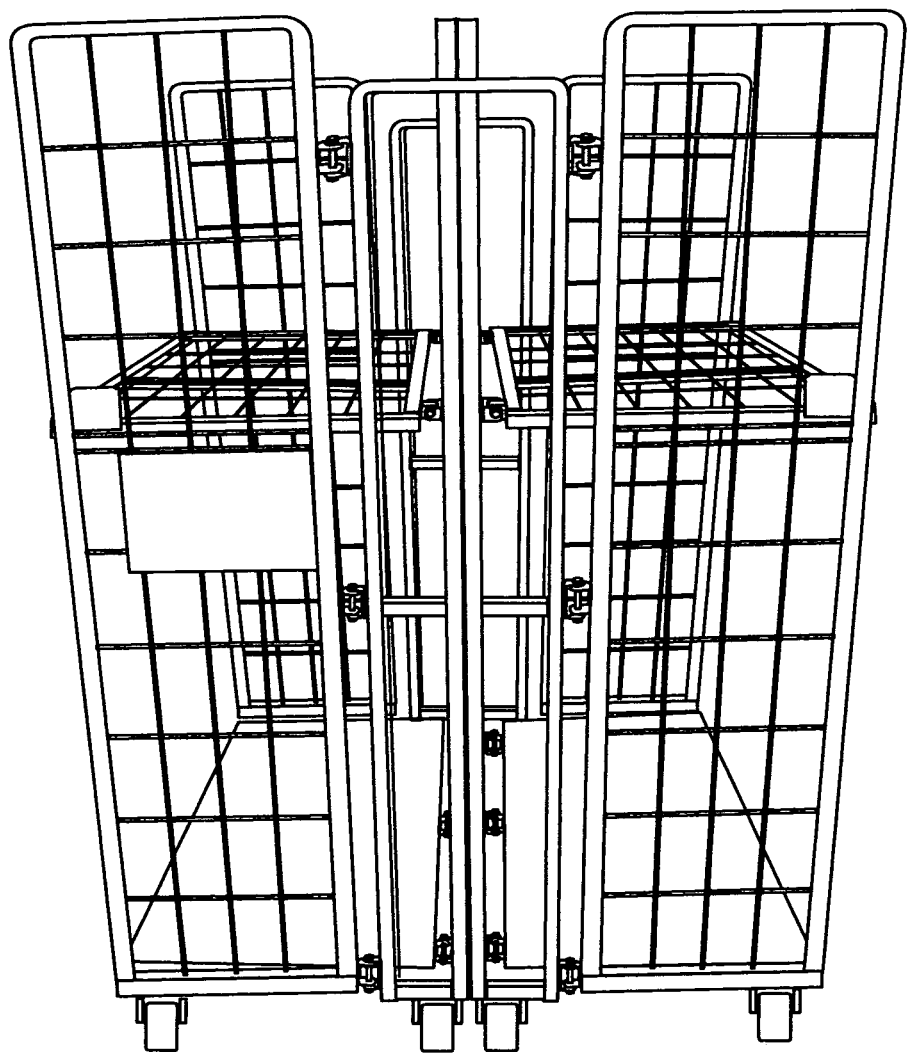
FIG. 10 shows the two carts of FIG. 8A from another view point.

In use, after two carts 10 are positioned side by side, the central section 57 of coupling means 32 of a first cart 10 is pulled outwardly of the flange 54, releasing free end 58 from its storage bore 40, is pivoted through, in this instance, 180 degrees (other angles of placement of the storage bore could be used), and the free end 58 is now positioned to couple with bottom associated coupling means 42 in the form here of a coupler bore 42 in the second, adjacent cart 10. The coupler bore 42 is positioned at a predefined point along the base 14 of the adjacent cart 10 to accept the free end 58 of the coupling means 32 of the adjacent cart 10. It will be understood that this procedure for engaging and coupling the two carts 10 together will be applied along both the front and rear adjacent cooperating ends of adjacent bases 14. In other words, coupling means 32 from a first right end 30 of a first cart 10 is pivoted from its storage position on the first cart 10 into interconnection with associated coupling means 42 near a left end of an adjacent base 14 of a second cart 10 to join the bases 14 together as best illustrated in FIGS. 6A-6B.

Either before or after the bases 14 are releasably coupled or joined together, front and back, the top rear coupling means or coupler 24 is moved from its storage position on the first cart 10, as shown in FIGS. 1B and 2B, to a second cart 10 interconnecting position as shown in FIGS. 4A and 4B. In this respect, it will be seen that the top rear coupling means or coupler 24 is positioned along the right rear end 23 of the rear cross member 20 and comprises the pivotable straight exterior arm 25 having a predetermined length such that, when two, or first and second, carts 10 are positioned side by side, adjacent one another, an L shaped inwardly extending flange or hook 26 on free end 28 of the arm 25 will extend laterally of a left side wall 16 of the adjacent cart 10 and will snap down over associated coupling means 60 comprising a left corner section 60 of the rear cross member 20 of the second, adjacent cart 10, immediately adjacent top horizontal rod 18 of the wall 16 of the adjacent cart 10, coupling or interconnecting top rear cross members 20 of the two adjacent carts 10 together. As noted here the associated coupling means is part of the upper frame structure of the other cart, itself. Of course, a coupling means could be used where the coupling means is part of the cart structure and the associated coupling means engages with it. Of course this coupling means and associated coupling means could take other known coupling means forms, such as those mentioned herein or other known forms and adapted to the two carts.

Figure 13:
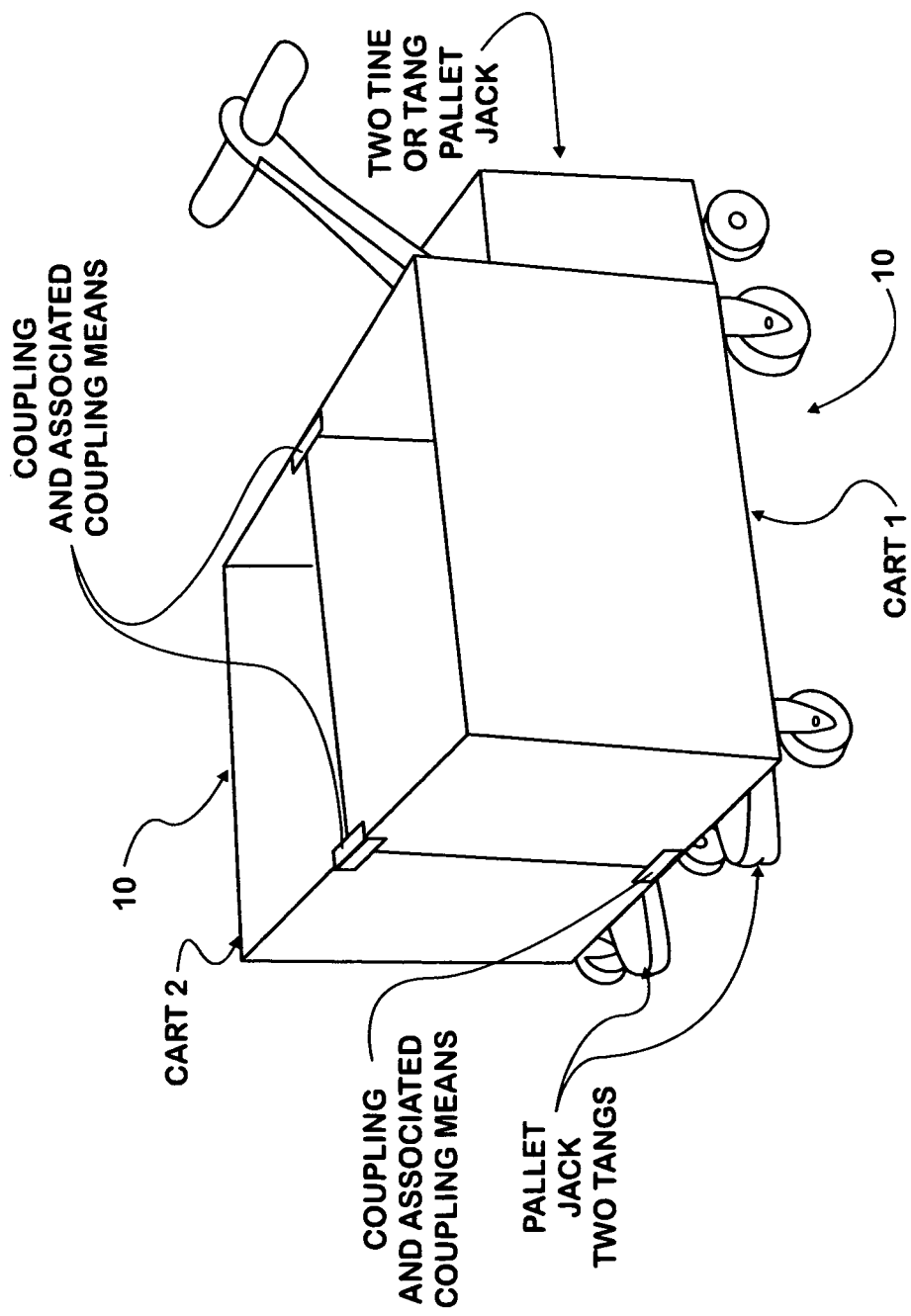
FIG. 13 shows two coupled carts or pallets which may be lifted using a two tang pallet jack, similar as was done for the fork lift shown in FIG. 6C.

Once engaged in this manner, it will be understood that the carts 10 are of a predetermined width such that an engaged pair of carts 10 can be supported on tines or tangs 62 of the fork of a regular fork lift truck 68 in a manner where one of the two tines or tangs 62 of the fork lift truck 68 centrally engages a respective cart 10 of the engaged pair of carts 10, generally centrally as related to a lateral extent of the bases 14 of the carts 10. Such coupling and engagement capability precludes and/or prevents disengagement or unbalancing of a load (on the lift truck or device) comprising two interconnected carts 10 so that the pair can be engaged, lifted, moved, lowered and disengaged from a regular fork lift truck 68, without need for provision of a specially configured multiple fork tangs (beyond the normal two) fork lift truck, such specially configured fork lift trucks (or such accessory) being higher or extra in price. When a pallet jack is used instead, if it is of the type with a wide flat lifting surface it would be centered on the connected carts so as to lift both carts at once. To avoid the cart wheels, this type jack can be inserted crosswise to the two carts. See FIG. 11. If the pallet jack of the two tang or tine type, it would be positioned under the carts similar as the two tang or tine fork lift as shown in FIG. 13.

It will also be considered as advantageous that these carts 10 are easily, quickly and conveniently, releasably interconnected (or disconnected), inasmuch as aisles in stores, at times, are narrower than aisles, for example, in warehouses or distribution centers, and in the store it may be possible to disconnect the carts 10 from each other so that they can each move and singly fit down a narrower aisle.

Another feature of the cart 10 of the present invention is a retractable shelf 22, as best illustrated in FIGS. 7A-7E, which is pivotably engaged by side end hinges means 82 on the rods 18 of one side wall 16 of the cart 10. The shelf 22 has a predetermined extent across and approximately equal to the internal or lateral width of the cart 10, and has a swing edge 84 which has latch or connection means 86 thereon in the form of hooks 86 which engage over an aligned horizontal bar 18 of the opposite side wall 16 of the cart 10, to create a further elevated product support shelf 22, as illustrated in FIG. 7A. If the shelf used is not required, the foldable or retractable shelf 22 is pivoted about the pair of hinges 82 thereof, one hinge 82 along each side edge of the shelf 22, in this embodiment one side edge facing forward and the other side edge facing rearward, as related to the configuration of the cart 10, as best shown in FIG. 7C, to a vertical orientation and can be fixed in this position through the provision of latch means 92. As shown in FIG. 7D, latch means 92, here comprise a two piece coupling means or coupler 92 with one piece being a slotted tab 94 positioned along the swing edge 84 of the shelf 22. The second piece 96 here is shown to comprise, for example, a spring biased J shaped rod 98 which is engaged by a framework 100 to one upright rod 18 of the side wall 16 to which the shelf 22 is attached by means of the hinges 82, the framework 100 being positioned in such a manner that the spring biased rod 98 engages within slot 102 of slotted tab 94 when the shelf 22 is in the upright storage position thereof (see FIG. 1A). The spring biased rod 98 has a spring 104 along a first vertical length area 106 thereof which is between top and bottom horizontal frame members 108 and 110, respectively, with top frame member 108 having a slot 112 therein which aligns with the slot 102 of the slotted tab 94 to allow for interconnection of the framework 100 and the slotted tab 94 on the swing end of the shelf 22.

Returning to FIG. 6A, it will be seen that the rear wheels 12 of each cart 10 are positioned at each rear corner 30 and 44 of the base 14 while the front wheels 16 are engaged along the front edge of the base 14, but inset from the corners thereof. Extending front to back along a length of each cart 10 there is provided a pair of support struts 120, which each extend between a rear wheel 12 and a corresponding front wheel 12, to provide added support for the base 14 of each cart 10 and the plates 122 forming the base 14, which rest on cross brace members 124 extending across the bottom of the base 14 of each cart 10.

Another embodiment of two carts 10' is shown in FIGS. 8A, 8B, 8C, 9 and 10. This cart is generally similar to the first described embodiment, and similar reference numbers, except they are primed, are used to describe similar components. For example, 10 and 22 become 10' and 22'. In carts 10', the high walls 20' are back to back with two high side walls 16' on either side for each cart 10'. The pivotable shelves 22' are attached to the wall 20'. The cart 10' has greater distance between walls 16' than carts 10 do between walls 16. The distance between wall 20' and its opposite edge is less than the distance between the walls 16'. The bases 14' are similar shaped as are the shelves 22'. One difference between the two embodiments 10 and 10' is the second embodiment carts 10' can be joined by a coupling means 25' in the form of a pivotable bolt or bar 26' on one cart 10' which is received in the associated coupling means 60' in the form of a "u" shaped bracket 60' fixed, as by welding, to the other cart 10'. When swung into place the bar 26' from the first cart 10' can be held in place in the bracket 60' on the second cart 10' by inserting a pin 130 in openings in both the bar 26' and bracket 60'. To prevent loss of the pin 130 it could be tethered to the first or second carts 10' or the bar 26' or bracket 60' or other portions thereof. These other embodiments may also have one or more foldable shelves 22'. It should be understood that the carts 10' of this embodiment can be coupled or uncoupled to a similar cart 10', moved, loaded, lifted, lowered, transported, unloaded from the transport vehicle, and/or then repeated, just like the first embodiment described above.

Figure 11:
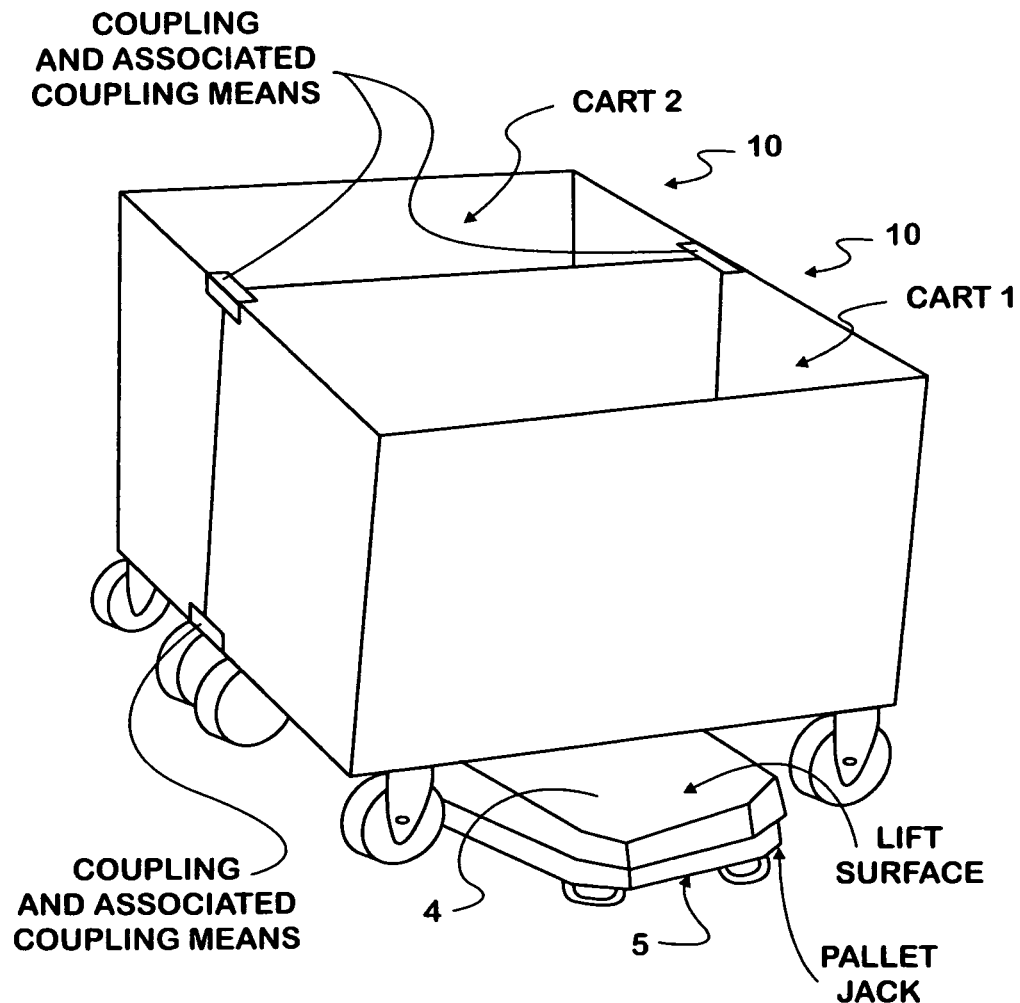
FIG. 11 shows the two carts being lifted by an electric dolly or pallet jack having a single wide lift surface, note the lift surface is inserted crosswise to clear the wheels of the two carts.

FIG. 11 schematically shows carts 1 and 2, which could be either embodiment, lifted by the single, wide lift surface 4 of the electric dolly/or pallet jack 5. Note the lifting surface is inserted crosswise to the coupled two carts to clear the wheels of the cart.

FIG. 12 is a table of suitable pallet or cart dimensions.

FIG. 13 schematically shows two coupled carts or pallets (of either embodiment) which may be lifted using a standard two tang pallet jack in a manner similar to a two tang or tine fork lift truck.

As described above the apparatus and method for side by side releasably couplable pallets or carts provide a number of advantages, some of which have been described above and others of which are inherent in and/or apparent from the invention. Also, modifications may be proposed to the method and its steps and equivalents thereof, and apparatus and its elements and equivalents thereof, without departing from the teachings of the invention.

What is claimed is:

1. A cart for moving items from one location to another over the ground adapted to be connected to an identical cart, said cart having a height of at least 48 inches, said cart having adjacent one side coupling means which are adapted to connect to associated coupling means on another of the identical cart, said cart having adjacent its other side associated coupling means which are adapted to connect to coupling on one side of the identical cart, said coupling means and associate coupling means forming at least a top coupling located on an upper half or higher of said cart, said cart having a bottom having a ground clearance of at least 5 inches said bottom having structure extending from said bottom to locate a tang of the standard lift truck generally centrally of the bottom and being capable of accommodating and receiving one of the tang of the lift truck or the pallet jack and be lifted off the ground by the tang or pallet jack, said cart having at least three wheels upon which the cart can stand alone and be moved over the ground, alternatively, said cart wheels being lifted off of the ground by one of a single standard lift truck with two tangs, one of which is under the cart and the other of which is under the identical cart, and a pallet jack, said cart having at least two sides formed of generally vertical sidewalls cooperating with said bottom for forming an interior of the cart adapted for containing the items, at least another side or top of the cart provides access into the interior said cart, when connected together said cart and identical cart are adapted to be lifted, moved and/or lowered by one of said single standard lift truck with a two tang fork and pallet jack which engages both said cart and identical cart, said coupling means and associate coupling means when coupled together permitting the coupled carts in balance to move on the ground, be raised, or lowered, moved over the ground by one of the single lift truck or pallet jack, without toppling over, with the wheels off the ground, and when disconnected the cart can be used individually and moved with its own wheels engaging the ground.

2. A cart as in claim 1, wherein said coupling means and associated coupling means including a bottom coupling.

3. A cart as in claim 1, wherein said cart accepts said tang of lift truck in one direction and said pallet jack in a generally perpendicular direction.

4. A cart as in claim 1, wherein said coupling means and said associated coupling means have connecting positions and non-connecting stored positions.

5. A cart as in claim 1, wherein said coupling means is adapted to act on a part of the structure of the identical cart which forms the associated coupling means.

6. A cart as in claim 1, wherein a foldable shelf is provided in the cart.

7. A cart as in claim 6, wherein said cart has four wheels, and said shelf can be folded generally vertical against the cart out of the way, or folded horizontally to function as a shelf.

8. A cart as in claim 7, wherein said cart and shelf have hinge means to permit the shelf to pivot, and latch means to hold the shelf in its folded and unfolded positions.

9. A pair of carts as in claim 1, wherein two of said carts are connected to each other in a side by side relationship, said coupling means and associated coupling means being releasably connected together to side by side join said carts.

10. A method of building a cart and pallet for moving items from one location to another over ground, and connecting to another identical cart, comprising the steps of:
providing a bottom to the cart, providing at least two generally vertical sidewalls to the cart, forming an interior of said cart by said bottom and said at least two sidewalls for containing items in said interior of said cart; providing an access to the interior of the cart for loading and unloading items, providing a height above the ground of at least 48 inches to the cart, providing a clearance above the ground of at least 5 inches,
providing coupling means on or adjacent one side of one of the cart and which are for connecting to associated coupling means on the other side of the identical cart providing associated coupling means on or adjacent the other side of the cart which are for connecting to coupling means on the one side of the cart, locating said coupling means and associated coupling means on an upper half or higher of said cart, forming at least a top coupling with said coupling means and said associated coupling means, providing two of said carts, coupling the two carts together using said coupling means and associated coupling means, providing at least three wheels on the cart, providing structure on said bottoms on the carts accommodating and locating one of the two tangs of the standard lift truck under the center of the cart for raising, moving and/or lowering the coupled carts, and also accommodating a pallet jack for raising, moving, and/or lowering the coupled carts, moving the carts either coupled together either with the wheels on the ground, with said wheels off the ground with both, alternative, a two tang standard lift truck or a pallet jack, and or uncoupling the carts and moving the carts individually with said wheels in contact with the ground.

11. The method of claim 10, comprising the step of coupling the two carts side by side together using said coupling means and associated coupling means.

12. A method of restocking a store and for moving items from a first location to a second location with a pair of identical carts, each with at least three wheels, each with coupling means for connecting said carts together, using one of a standard lift truck with a two tang fork or a pallet jack, said carts having structure to center a tang under the cart, said cart having an interior formed by said bottom at least 5 inches above this ground and at least two generally extending sidewalls for containing said items, an access to load and unload items into and from the interior, said sidewalls being at least 48 inches in height, said coupling means being at least half the height or higher than the height of the sidewalls, comprising the steps of:
moving the pairs of cart separately or coupling two carts together and;
moving the coupled carts together while one of filling the carts and/or
moving them to a place for transport, at the first location locating one of the two tangs of a standard lift truck or pallet jack under the center of each of the coupled carts for raising, moving and/or lowering the coupled carts, and also accommodating a pallet jack for raising, moving and/or lowering the coupled carts;
raising coupled the carts with both, alternatively, one of a standard two tang fork lift or pallet jack with one of the tangs under each one of the pair of carts,
lowering the coupled carts for transport into a truck, disengaging the tangs or pallet jack from the pair of carts,
transporting the carts to the second location by truck,
raising the coupled carts in the truck,
moving the coupled carts from the truck into the second location,
lowering the coupled carts at the second location, and if desired using the coupled carts for restocking at the second location, by alternatively,
uncoupling the carts for using and moving them uncoupled and individually with the wheels on the ground, or moving the carts at the second locations either coupled together either with the wheels on the ground, or with said wheels off the ground with, alternative, a two tang standard lift truck or a pallet jack, for restocking at the second location.

13. A pair of carts as in claim 1 connected together in a side by side relationship.

14. A pair of carts as in claim 13, wherein said pair of carts bottoms accept said tang of lift truck in one direction and said pallet jack in a generally perpendicular direction.

15. A pair of carts as in claim 13, wherein said coupling means and said associated coupling means have connecting positions and non-connecting stored positions.

16. A pair of carts as in claim 13, wherein said coupling means on one of said pair of carts acts on part of said other cart.

17. A pair of carts as in claim 13, wherein a foldable shelf is provided in each of the carts.

* * * * *